United States Patent [19]
Morin et al.

[11] Patent Number: 5,348,329
[45] Date of Patent: Sep. 20, 1994

[54] TRAILER WITH COMBINED TOWING AND CENTERING DEVICES

[75] Inventors: Andre Morin; Nicole Morin, both of Louverne; Patricia Morin, Tours; Tony Morin, Bron, all of France; Christophe Morin, San Anselmo, Calif.; Nathalie Loizeau, Paris, France

[73] Assignee: Clipcar Industrie, Charlemagne, France

[21] Appl. No.: 849,015

[22] PCT Filed: Dec. 6, 1990

[86] PCT No.: PCT/FR90/00883
§ 371 Date: Apr. 20, 1992
§ 102(e) Date: Apr. 20, 1992

[87] PCT Pub. No.: WO91/08940
PCT Pub. Date: Jun. 27, 1991

[30] Foreign Application Priority Data

Dec. 2, 1989 [FR] France .................. 89 16367
Sep. 27, 1990 [FR] France .................. 90 12086
Nov. 20, 1990 [FR] France .................. 90 14401

[51] Int. Cl.$^5$ .................. B60D 1/173; B60D 1/36
[52] U.S. Cl. .................. 280/461.1; 280/478.1; 280/496; 280/477
[58] Field of Search .............. 280/406.1, 406.2, 423.1, 280/424, 433, 441, 459, 461.1, 462, 465, 477, 478.1, 479.2, 479.3, 485, 486, 496, 497, 499

[56] References Cited

U.S. PATENT DOCUMENTS 3,169,028  2/1965  Scrivner .................. 280/479.2
4,893,829  1/1990  Davis .................. 280/479.2

FOREIGN PATENT DOCUMENTS

136240   4/1985  European Pat. Off. .
245570  11/1987  European Pat. Off. .
2093783  9/1982  United Kingdom .......... 280/496
2129750  5/1984  United Kingdom .
8601780  3/1986  World Int. Prop. O. .

*Primary Examiner*—Margaret A. Focarino
*Assistant Examiner*—Kevin Hurley
*Attorney, Agent, or Firm*—David I. Roche

[57] ABSTRACT

The trailer including a main towing device movable by articulation and sliding, from top to bottom, from front to rear and from right to left to facilitate hitching the trailer to the back of a motor vehicle using a conventional ball-type trailer hitch in conformity with international road regulations. The towing device includes a flexible fixing device to fasten the front part of the trailer to the roof of the motor vehicle through a transverse and vertical centering device which slides from front to rear through sliding rails mounted on a roof-rack, or, as an alternative, through sliding rails mounted underneath the front part of the trailer. The combination of the devices enables rapid coupling and uncoupling of the trailer and the motor vehicle, the locking of the sliding motion of the main towing device in road-ready position being automatically performed by means of locks.

10 Claims, 4 Drawing Sheets

Fig. 11

TRAILER WITH COMBINED TOWING AND CENTERING DEVICES

BACKGROUND AND SUMMARY OF THE INVENTION

The present invention concerns a trailer equipped with a main towing device, vertically movable with respect to the axle(s) of the trailer, and a centering device fastened underneath the front part of the trailer which projects over the roof of the motor vehicle.

A trailer of this type is already known under WIPO Patent Number WO 86/01780. It has in common with the present invention the fact that by means of an integral and vertically movable towing head, the trailer is connected to a hook device with a round head which constitutes a ball-type joint mounted at the back of a motor vehicle, and the fact that the front part of the trailer projects over the roof of the motor vehicle and is fastened to it at one point.

All currently known motor vehicle/trailer combinations have the disadvantage that hitching the trailer to the back of the motor vehicle is difficult. Fastening the trailer to the roof of the vehicle is also difficult, especially because of the lack of transverse and longitudinal clearance of the main towing head and because of the slide system used to fasten the trailer to the roof of the motor vehicle, which makes it necessary to couple the trailer to the roof of the motor vehicle first.

The present invention overcomes these disadvantages by using an articulated main towing device, fitted on the trailer, which is hooked to a conventional ball-type hitch situated at the back of the motor vehicle which can be used for all other conventional trailers, in conformity with international road regulations. This articulated main towing device and ball-type hitch allows rapid coupling and uncoupling of the trailer and motor vehicle in spite of the combined use of a flexible coupling device to fasten the front part of the trailer to the roof of the vehicle by means of a transverse and vertical centering device which slides from front to rear and is fitted on the trailer. Thus, it is possible to couple the centering device either before or after coupling the main towing device of the trailer to the back of the vehicle.

The main towing device is preferably situated in the vertical and longitudinal midplane of the trailer to which it is coupled, and its head is situated in front of its axle(s), and hooked to one of the conventional ball-type hitch devices that are commonly mounted on the back of motor vehicles.

The main towing device of a trailer embodying the present invention may include of the following elements:

1. A towing head in which the tow-ball of the motor vehicle is lodged, equipped with a handle system which allows coupling and uncoupling as the handle is pushed down or raised up respectively;

2. A body in which the piston fixed to the towing head can be lodged and which drives the overrunning brake system of the two or four wheels of the trailer;

3. One or two articulated arms that connect the body of the main towing device to a transverse rotating shaft, in one or two elements, situated rearward of the body, and enable the towing head to follow the upward or downward movement of the tow-ball mounted on the motor vehicle, which moves with the wheels of the axle(s) of the vehicle when they pass over relief variations with respect to the ground level supporting the wheels of the axle(s) of the trailer whose center of gravity is approximately situated in the transverse axis of the axles;

4. One or several compression and/or tension springs fastened at one end to the main towing device body or arms by means of bearing plates and at the other end to the chassis or body of the trailer, the possible action of the springs being intended to support and dampen the upward and downward movements of the towing head depending on the movements of the motor vehicle with respect to the trailer in the case of relief variations that place the wheels of the vehicle and trailer at a different ground level;

5. A sliding device for the pivoting shaft on which hinges the arm(s) of the main towing device body. The sliding device includes one or two elongated holes, or as an alternative, one or two slides with rollers, ball bearings, or plates or blocks made of metal or self-lubricating material sliding in rails, which enable the pivoting shaft of the towing head to shift from front to rear, and to the ends of which the bottom plates with rollers, plates or blocks are fastened. The shifting of the shaft induces shifting of the towing head both in the plane perpendicular to the axis of the axle(s) and slantwise, more to the front or to the rear on the right hand side or more to the front or to the rear on the left hand side. This forward/backward, left/right shifting device, together with the upward and downward movement of the articulated arm(s) of the towing body, makes it easy to couple the towing head onto the ball mounted on the motor vehicle, even if the head is not exactly placed in the vertical, horizontal, longitudinal or transverse plane with respect to the ball. The sliding and articulating of the main towing device makes it possible to move the towing head in all directions to couple it onto the ball, without shifting the motor vehicle or the trailer, whether the trailer is being supported by the roof of the vehicle or not;

6. A device which locks the pivoting shaft of the main towing device in a road-ready or working position, once the trailer and the motor vehicle have been realigned in the vertical midplane, by simply moving the vehicle forward for a few meters in a straight line, for example, once the trailer has been coupled to the back and roof of the vehicle. This locking device may consist of a screw mounted to a crossbar of the chassis, and a head which can easily be screwed down by means of a crank. For example, a screw equipped with a nut, mounted on a device fitted on the pivoting shaft of the towing device, is tightened through a yoke-type bar, firmly locking the pivoting shaft of the main towing device in the road-ready or working position, i.e. in backstop position, perpendicular to the longitudinal axis of the trailer, allowing upward or downward movement of the head described in C.

As an alternative, the sliding of the rotating shaft may be locked by means of transverse or vertical locks, pulled by one or several locking springs which lock the sliding of the rotating shaft in a road-ready or working position. The unlocking is performed by means of a pedal or handle; the locks are maintained in released position by a sliding or swinging wedge-type part actuated by a spring. When the plates or blocks with which the pivoting shaft of the towing device is connected come up against the slide stop on the rear safety ends that are solidly fixed to the rails, the wedge-type part is forced back by a metal or self-lubricating block, or the roller plate, fastened to one of the ends of the rotating shaft of the towing device, so that the wedge-type device is pushed out of the away, thus releasing the locks to be moved by the main locking spring(s) into the position that holds the sliding parts of the main towing device firmly against the rear slide stops.

The device which maintains the trailer in line with the motor vehicle, in order for the motor vehicle and trailer combination to manoeuvre and behave like a single vehicle, is mounted on the front of the trailer and on the roof of the motor vehicle, and includes the following elements:

1. A roof-rack reinforced with crossbars and struts which supports the front part of the trailer, and is solidly clamped to the roof of the motor vehicle;

2. Two high-strength sliding rails, carried by the roof-rack, each including an element which slides freely in a C-shaped rail. Self-lubricating rollers or ball bearings are linked by a bearing plate in which a hole has been pierced to receive the grooved centering head of the trailer. A key, composed of one or two elements which operate as a pliers while remaining an integral part of the plate, will fit into the grooved centering head, mounted underneath the front part of the trailer, thus interlocking the head with the roof-rack in vertical or transverse direction; and 3. A centering head, fixed to an element made of elastic material, commonly called a "silentbloc" is mounted on the reinforcing structure of the trailer's front part through a support which is also fixed to the "silentbloc". The "silentbloc" permits slantwise movements in all directions as well as the dampening of these movements with respect to the vertical axis of the centering head when the wheels of the trailer pass over bumps, or when in oblique position with respect to the ground level supporting the wheels of the motor vehicle. The oblique position occurs when the wheels pass over relief variations and when the trailer and the motor vehicle change position due to the independent action of their respective individual suspensions. The free end of the centering head may have a conical shape to make it easier to lodge in the hole in the bearing plate carried by the roof-rack mounted on the roof of the motor vehicle. The slantwise left/right and forward/backward movements with respect to the direction of motion are absorbed by the centering head. Movements of the trailer and the motor vehicle toward and away from each other are possible. These movements are caused at the fastening point of the trailer to the roof-rack of the vehicle by:

a. the upward and downward movement of the trailer with respect to the vehicle caused by the upward or downward shifting of the towing head of the trailer by means of the articulated arms of the towing device; and b. the forward/backward play of the brake piston fitted on the towing head, or by the forward or backward movement caused, before the head of the main towing device has been lodged on the tow ball, by a manipulation of the trailer or of the motor vehicle, once the centering head has been lodged in the bearing plate.

The movements described in the preceding section are made possible by the sliding of the bearing plate. This bearing plate, onto which is keyed the centering head fitted on the front part of the trailer, is connected with the sliding rails carried by the roof-rack, the roof-rack being solidly mounted on the roof of the motor vehicle. It is also possible to operate the sliding bearing plate forward or backward by hand, without having to shift the trailer or motor vehicle in order to exactly oppose the hole in the plate mounted onto the vehicle and the centering head of the trailer. This makes keying of the centering head, and consequently the coupling, easier.

As an alternative, the centering head, which is fitted on an element made of "silentbloc" is mounted on the front part of the trailer by means of a support fastened onto a slide, thus allowing it to slide from front to rear, absorbing the movements of the trailer and the motor vehicle toward and away from each other. The support of the centering head may be hand operated by means of a handle to make it slide from front to rear, thereby aligning the centering head with the hole in the bearing plate equipped with the key which, in this variant, is rigidly mounted on the roof-rack. It is thus not necessary to position the trailer, or the motor vehicle, with precision.

The trailer of the present invention, may be equipped with a hinged panel covering its entire rear face. When the trailer is not being driven, this panel may be used to create an awning, supported and kept in place by a minimum of two removable poles made of steel or aluminum tubes and adjustable in height. A system of elastic fastening lugs may be used to hang a fabric tent canopy underneath the lifted awning panel, the tent canopy of which is composed of three or four sides, mounted approximately vertically, ensuring tightness on the ground, and of one element assembled to the other elements to form a near horizontal covering. The advantages of a tent canopy system underneath the rear awning panel may be preserved even when the panel remains closed on the rear face of the trailer, by means of a minimum of three easily removable bars, fixed so as to form a framework on the hinge, level to each side of the rear face of the trailer and to the upper ends of the two poles that were initially intended to support the rear panel in lifted position, and fixed by way of crossbar between the upper ends of the poles. Suspending fastening lugs of different tent canopy sides from the bars may be performed by means of a system similar to the one used to fix the lugs underneath the lifted rear awning panel. The awning panel, hinged down, may be equipped on its upper outside part with fastening points underneath the hinge line, to replace the fastening points situated on the inside of the panel used when the latter is in lifted position.

When the trailer is uncoupled from the motor vehicle and the motor vehicle has been moved a few meters away, it is also possible to utilize the space situated underneath the front part of the trailer, by installing a tent canopy composed of several sides, whether liftable or not, the trailer being supported by hinged posts.

After the trailer has been uncoupled from the motor vehicle, the motor vehicle can make use of its ball-type towing device to tow any other conventional trailer. The roof-rack may remain mounted on the roof of the vehicle and be used in a conventional way to carry goods, and, after having been easily mounted on a vehicle roof with or without a gutter, it may be just as easily dismounted without leaving any apparent fixing marks.

Therefore, it is an object of the present invention to provide a combination motor vehicle and trailer which maintains alignment of the trailer and motor vehicle while driving.

Another object of the present invention is to provide a combination motor vehicle and trailer which allows separate use of the car once the trailer has been unhitched.

Yet another object of the present invention is to provide a highly maneuverable single body vehicle, such as a motorized camping vehicle.

BRIEF DESCRIPTION OF THE DRAWINGS

The objects and advantages of the present invention will be better understood upon a reading of the following specification, read in conjunction with the attached drawings, wherein.

DETAILED DESCRIPTION OF THE INVENTION

Figures 1, 2:
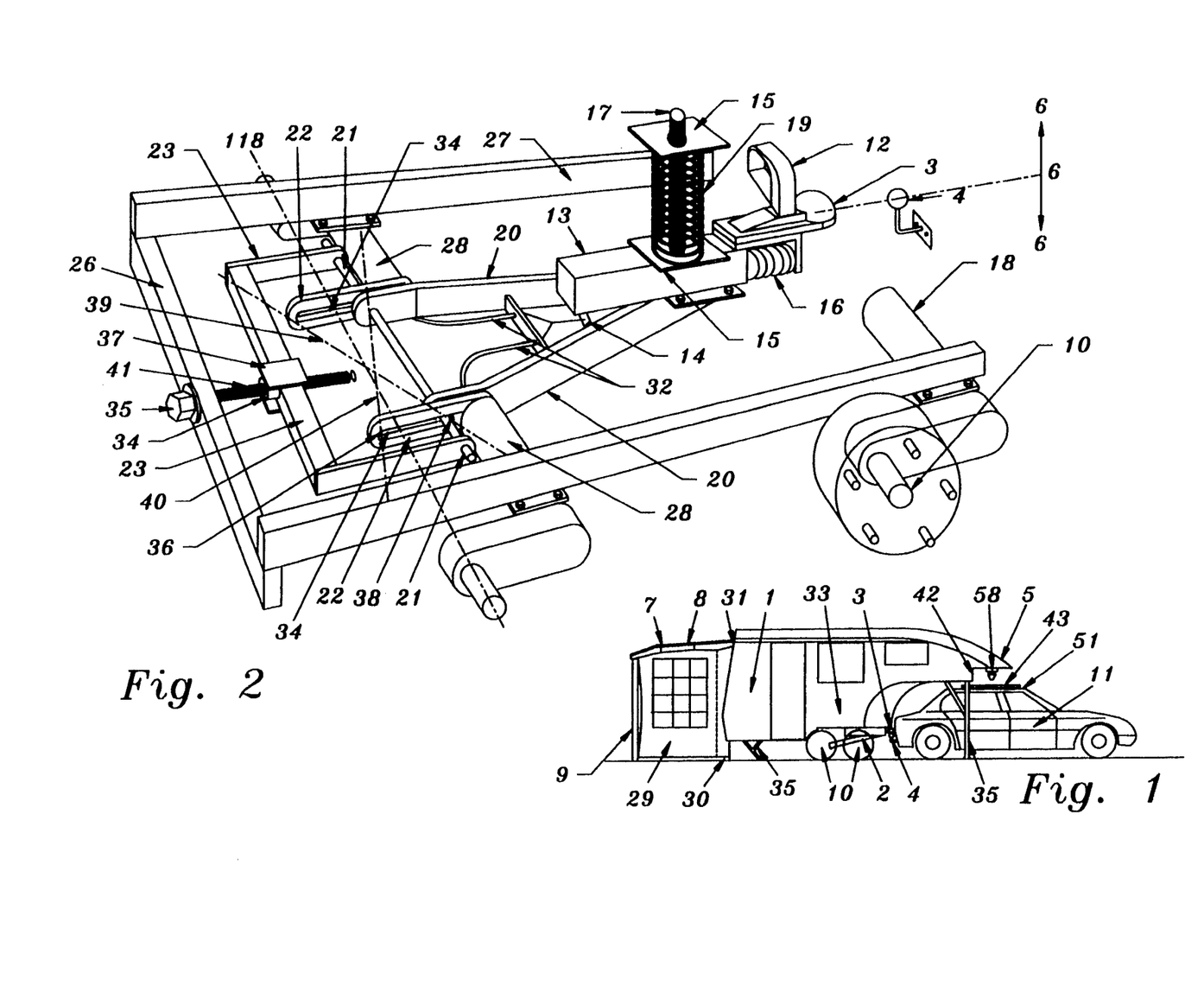
FIG. 1 is an elevational view of the trailer of the present invention, shown with its main towing device, its centering device fixed to the roof of the motor vehicle, its rear panel lifted and the tent canopy suspended from it.
FIG. 2 is a perspective view of the articulated main towing device of the trailer of the present invention.

In FIG. 1, the trailer 1 is equipped with a main towing device 2 which is placed in such a way that the towing head 3 is situated slightly in front of the axle(s) 10 of the trailer 1, with respect to the direction of motion. The towing head 3 of the trailer 1 is lodged on the ball-type hitch 4 carried by the motor vehicle 11. The centering head 58, mounted on the reinforcing structure 42 fitted on the front part of the trailer 1, is keyed on a sliding device 5 carried by a roof-rack 43 solidly mounted on the roof of the motor vehicle 11. The rear panel 7 of the trailer 1 can be lifted and maintained in lifted position by at least two poles 9 which is adjustable in height, the upper part of the panel being hinged 31.

A tent canopy 29 is composed of three or four sides that ensure tightness on the ground 30 is suspended by means of fasteners 8 from the lifted panel 7. The panel 7 may remain closed on the rear face of the trailer 1 and can be replaced with a framework of at least three bars and a transverse fastening device, level with the hinge 31 of the panel 7 from which is suspended the same tent canopy 29.

The chassis 27 of the trailer 1 is equipped with one or two axles 10 whose axle shaft may, but need not, be cut in two elements 18. In a second axle, the elements 28 of the axle shaft may serve to support the main towing device 2. In a trailer 1 chassis 27 with a single axle, a supporting cross strut replaces the axle shaft 28.

The main towing device 2 of the trailer 1 is composed of a towing head 3, equipped with a handle system 12 which makes it possible to couple or uncouple the trailer towing head 3 and the motor vehicle ball-type hitch 4 by means of standard fasteners available on the market.

The towing head 3 is attached to a piston 16 protected by a rubber sheath, and this piston 16, held by a spring or a hydraulic device, is pressed into a body 13 by the thrust developed by inertia when brakes of the motor vehicle are applied. The piston 16, through the action of this thrust then acts upon a lever 14 which pulls on the cables 32 that set the brakes of the axle wheels 10.

The body 13 of the main towing device 2 is mounted on two arms 20 that connect the body 13 with a shaft 21 which permits articulation of the towing device 2; the articulation of the towing device 2 on the shaft 21 enables the upward or downward movement of the towing head 3 to follow either the bottoming movement performed by the suspension of the motor vehicle 11, or the upward and downward movements of the trailer 1 when it passes over relief variations, or according to its load. This mobility of the towing head 3 avoids the risk that the motor vehicle 11 will inopportunely lift up the trailer 1 or, vice versa, that the trailer 1 will dangerously lift up the motor vehicle 11 when it passes over a speed bump or curb, for example, which would cause loss of wheel traction for the motor vehicle 11.

Tension and/or compression springs 17 and 19, respectively, may be mounted either above or underneath the plates 15 which are attached, one to the body 13 of the main towing device 2, the other to the chassis 27 or the body 33 of the trailer 1. This spring system 17/19 supports and dampens the upward and downward movements of the towing head 3 whether it is hooked onto the ball-type hitch 4 of the vehicle 11 or not.

The pivoting shaft 21 of the main towing device 2 is mounted in two guides 22 which are fixed to the struts 28 of an axle shaft which are an integral part of the chassis. The guides 22 may, for example, consist of two metal parts equipped with elongated holes or slots 34, situated at the ends of the shaft 21.

These slots 34 allow free forward or backward sliding of the pivoting shaft 21, parallel to a line 118 which is perpendicular to the vertical midplane 6 of the side rails of the chassis 27 and parallel to the wheel axle 10. Alternatively, the slots 34 allow a backward shifting of the shaft 21 on only one side which will place the shaft 21 slantwise 39 with respect to the perpendicular line 118 and will shift the towing head 3 to one side.

The slots 34 of the towing device 2 make it possible to move the towing head 3 upward, downward, forward, backward, to the left and to the right, and thus facilitate its being coupled onto the ball-type hitch 4 of the vehicle 11, whether the trailer 1 rests on the roof-rack 43 of the vehicle 11 or on the front or rear stabilization posts 35 mounted on hinges underneath the body 33 once the posts 35 have been hinged down to the ground 30.

While the towing head 3 is placed onto the ball-type hitch 4 it is free to move forward and backward and left and right, as well as up and down. For towing the trailer the towing head 3 needs to be locked in its towing position, which only permits it to move up and down. This is accomplished with the locking device 37 which screws the yolk-type device 23 back towards the chassis element 26 until the pivot shaft 21 is be pulled against the backstop positions 36 in the both the left and right guides 22 by means of a nut 24 hinged onto the yolk-type device 23 and a screw 41 the head of which 25 bears against the crossbar 26. The crank 73 is used to turn the screw head 25 to lock the tow head into the towing position, or to free the tow head for placing it onto or removing it from the ball-type hitch 4.

The previously described locked towing position of the towing device 2 is an essential feature of the present invention since it permits only upward and downward movement of the towing head 3 and at the same time it brings the trailer 1 and the motor vehicle 11 as near as possible to each other thus making it possible to maneuver the trailer/motor vehicle combination as though is a single-body vehicle.

Locking the main towing device 2 in the road-ready position can be facilitated as follows: after the towing head 3 has been coupled onto the ball-type hitch 4 on the motor vehicle 11 and after the centering head 58 has been coupled to the roof-rack 43 on the motor vehicle 11, but before the locking device 37 is screwed into the road-ready position, driving the motor vehicle 11 forward in a straight line for a couple of meters will cause the pivot shaft 21 to move against the front stop position 38 in both the left and right guides 22 which align the trailer and motor vehicle. Then, while still driving straight forward, a slight application of the brakes on the motor vehicle 11 will cause the trailer 1 to move by inertia toward the motor vehicle 11, thus pushing the pivot shaft 21 into the backstop position 36 in both left and right guides 22, and all that remains to be done to accomplish locking in the road-ready position to be ready for travel is to turn the screw head 25 until the device 23 is screwed against the chassis element 26 which locks the pivot shaft 21 in the back stop position 36 in the slots 34 on both the right and left sides.

Figures 3, 4, 5:
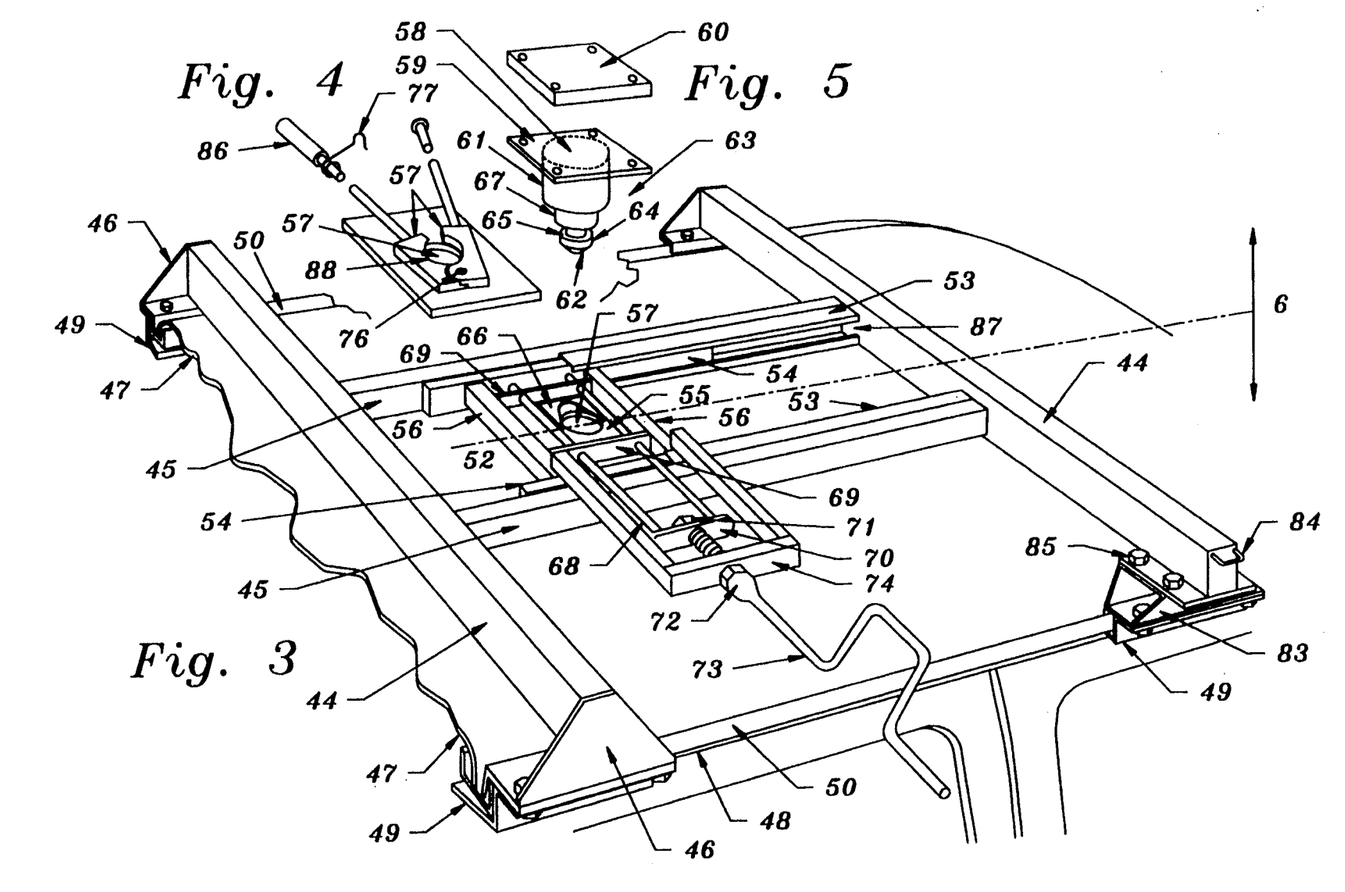
FIG. 3 is a perspective view of the centering device of the present invention by means of which the front part of the trailer is fixed to the roof of the motor vehicle.
FIG. 4 is a perspective view of the present invention showing the "pliers-type" keying of the centering head.
FIG. 5 is a perspective view of the present invention showing the centering head.

The motor vehicle 11, as shown on FIGS. 1 and 2, is equipped with a special roof-rack 43 composed of, for example, tubular, metal crossbars 44, braced with struts 45 placed perpendicular to the crossbars 44. The special roof-rack 43 is attached to the motor vehicle 11 by a system of metal lugs 46 which firmly clamp under the roof at the door entrances 48 or under the motor vehicle roof gutters 5. The lugs 46 are welded to the crossbars 44 or, as an alternative, bolted 83 in slots 85 to allow adjustment on the crossbar 44 which is also equipped with strap rings 84. To the struts 45, situated opposite each other on each side of the longitudinal axis 52 of the roof-rack 43, two sliding rails 53 are fixed approximately in the midplane 6. As shown in FIG. 3, each of these sliding rails 53 is composed of a C-shaped section 87 in which the sliding elements 54 move with the aid of self-lubricating materials, rollers or ball bearings (not shown).

The sliding elements 54 are interconnected by a bearing plate 55 equipped with reinforcing pieces 56. This bearing plate 55 has a rounded hole 57 in it, in which the cylindrical body of the centering head 58 is lodged. The centering head 58 is fixed to the reinforcing structure 42 mounted on the front part of the trailer 1 by means of a seat 59 bolted on the structure 42, through one or several intermediate wedges 60 to allow height adjustment.

The centering head 58 consists of two elements: the first element being intended for absorbing the opposite upward and downward movements of trailer 1 and motor vehicle 11 once these have been coupled to each other, i.e. the "silentbloc" 61 element made of reinforced elastic material fixed to the seat 59 which is bolted on the structure 42; and the second element being intended for centering and fixing the front part of the trailer 1 to the roof-rack 43 of the motor vehicle 11, i.e. the body 63 of the centering head 58 which has a cylindrical shape, also fixed to the "silentbloc" 61.

The body 63 is composed of three zones, a first zone which consists of the free end 62 of the body 63, preferably having a conical shape to make it easier to enter the base 64 into the hole 57, the diameter of the base 64 being slightly smaller than that of the hole 57 in the bearing plate 55, which is fixed to the sliding elements 54 of the roof-rack 43; a second grooved zone 65 intended for receiving the key 66 that interlocks the centering head 58 with the bearing plate 55 (See FIG. 6); and a third bearing zone 67 supporting the front part of the trailer 1 on the roof-rack 43 of the vehicle 11, through the centering head 58, the key 66, the bearing plate 55, and the sliding rails 53.

As shown in FIG. 3, the U-shaped key 66 can slide at right angles to the axis 52 of the roof-rack 43 as it is mounted on a slide 68, which passes through guides 69 and which may be adjusted by means of a screw device 70 which moves slide 68 by rotation within a nut 71 which is fixed to the slide 68. The head 72 of the screw 70, carried by a connecting bar 74 fixed to the reinforcing pieces 56 of the bearing plate 55, is turned by means of a crank 73. The crank 73 also serves to lock the nut 25 of the locking device 41 in a road-ready position.

Another keying device similar to "pliers" is shown in FIG. 4. Bearing plate 55 has hole 57 into which centering head 58 can fit, as shown in FIGS. 5 and 6. The two elements of the key 75 are fixed to the bearing plate 55 by a hinge pin 76. They may be closed around the groove 65 of the body 63 of the towing head 58 to couple the towing head 58 with the roof-rack 43 and are maintained in this position by a mechanical device which may, for example, consist of a hook 77. As an alternative, one of the elements of the pliers-type key may be rigidly 79 fixed to the bearing plate 55. A handle 86, whether fixed to the rigid key 79 or not, may be used to manually slide the bearing plate 55 forward or backward in order to align the hole 57 in it with the centering head 58. The keying devices shown in FIGS. 3 and 4 may be mounted either above the bearing plate 55, as shown in FIGS. 3 and 4, or underneath the bearing plate 55, as shown in FIG. 7.

Figures 6, 7:
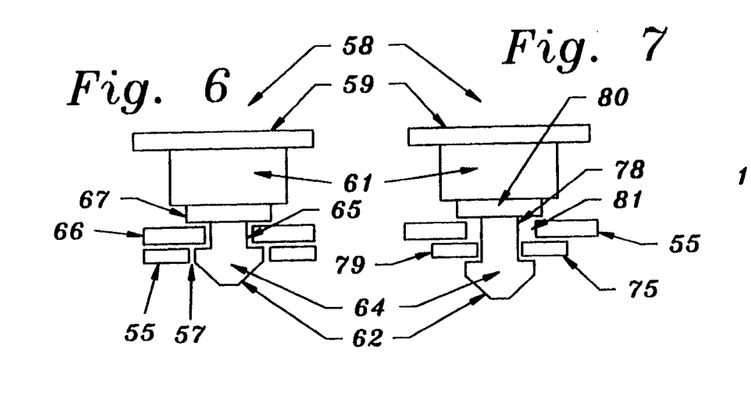
FIGS. 6 and 7 are detailed cross-sectional views of the present invention, showing the sliding bearing plate.

The diameter of the hole 57 in FIG. 6 is slightly larger than the diameter of the base 64 of the conical zone 62. The groove 65 of the centering head body 58 is wider than the thickness of the key elements 66 or 75, and the bearing zone 67 of the body 63, having a diameter larger than the hole 57, rests on the key elements 66 or 75 supported by the bearing plate 55.

The diameter of the hole 81 in FIG. 7 is slightly larger than the diameter of the base 64 of the conical zone 62, but smaller than the diameter of the bearing zone 80. In this particular variant, where one of the elements of the pliers-type key 75 is fixed, the diameter 82 which allows the passage of the base 64 of the conical zone 62, integrates the edge of the notch 88 of the fixed key element 79, the hole 81 of the bearing plate 55 being larger than the hole 57 shown in FIG. 6. The mobile key element 75 is closed in on the groove 78 of the centering head 58 body 63, and slightly pushes the head 58 so that the groove 78 also interlocks with the edge of the fixed key element 79; the groove 78 is wider than the combined thickness of the bearing plate 55 and the key elements 79-75. The bearing zone 80, having a diameter larger than the hole 81, rests on the bearing plate 55.

Figure 8:
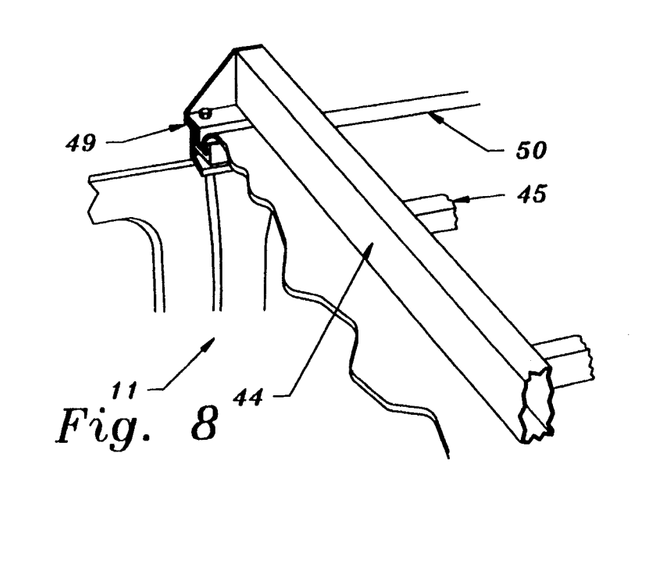
FIGS. 8, 9 and 10 are perspective views of the present invention showing alternative ways of positioning the centering head, its support, the centering plate carried by the roof-rack and its fastening to the roof of the motor vehicle.
Figure 9:
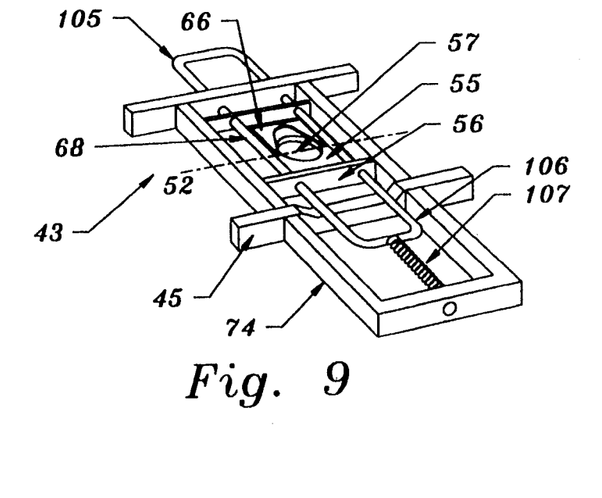

As shown in FIGS. 8 and 9, the bearing plate 55, equipped with reinforcing pieces 56 and a hole 57 in which the centering head 58 fits, is solidly fixed to the struts 45 that brace the crossbars 44 of the roof-rack 43 mounted on the motor vehicle 11 by means of counter-lugs 49 bolted in the gutters 50. A key 66 slides in right angles to the axis 52 of the roof-rack, by means of a slide 68 which passes through guides 69 and whose extreme ends in transverse direction with respect to the axis 52 of the roof-rack, consist of a pull handle 105 at one end of the transverse sliding rods 68 to which the locking jaw 66 is fixed, and an extension of the rods 68 at the other end, with a tension spring 107 attached between the extension rod and strut member 74 so that this spring keeps the key in a normally closed position.

Figure 10:
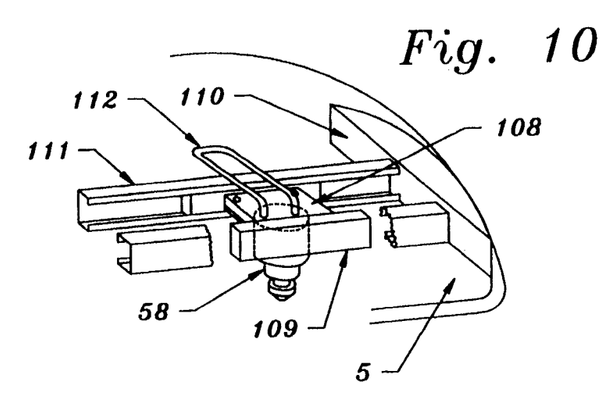

As shown in FIG. 10, the centering head 58 is fixed to the structure 110 of the front part of the trailer 1 through a support 108 mounted on self-lubricating sliding blocks 109 which travel in C-section sliding rails 111 to facilitate forward or backward shifting of the centering head 58. This movement of the centering head 58 may also be obtained by means of a ball bearing or roller bearing system. A handle 112 fixed to the support 108 makes it easy to shift the centering head 58 in the sliding rails 111 to put the head 58 opposite the hole 57 (FIGS. 6 and 9) or 81 (FIG. 7) of the key 66 and bearing plate 55 of the roof-rack 43, without having to position with precision the trailer 1 and motor vehicle 11 with respect to each other. All of this is accomplished by a simple hand-operated control. The handle 112 may also serve to shift the front part of the trailer 1 in transverse direction by making the trailer 1 slightly swing on its wheels 10 to align the centering head 58 with the roof-rack hole 57/81 in the bearing plate 55.

Figure 11:
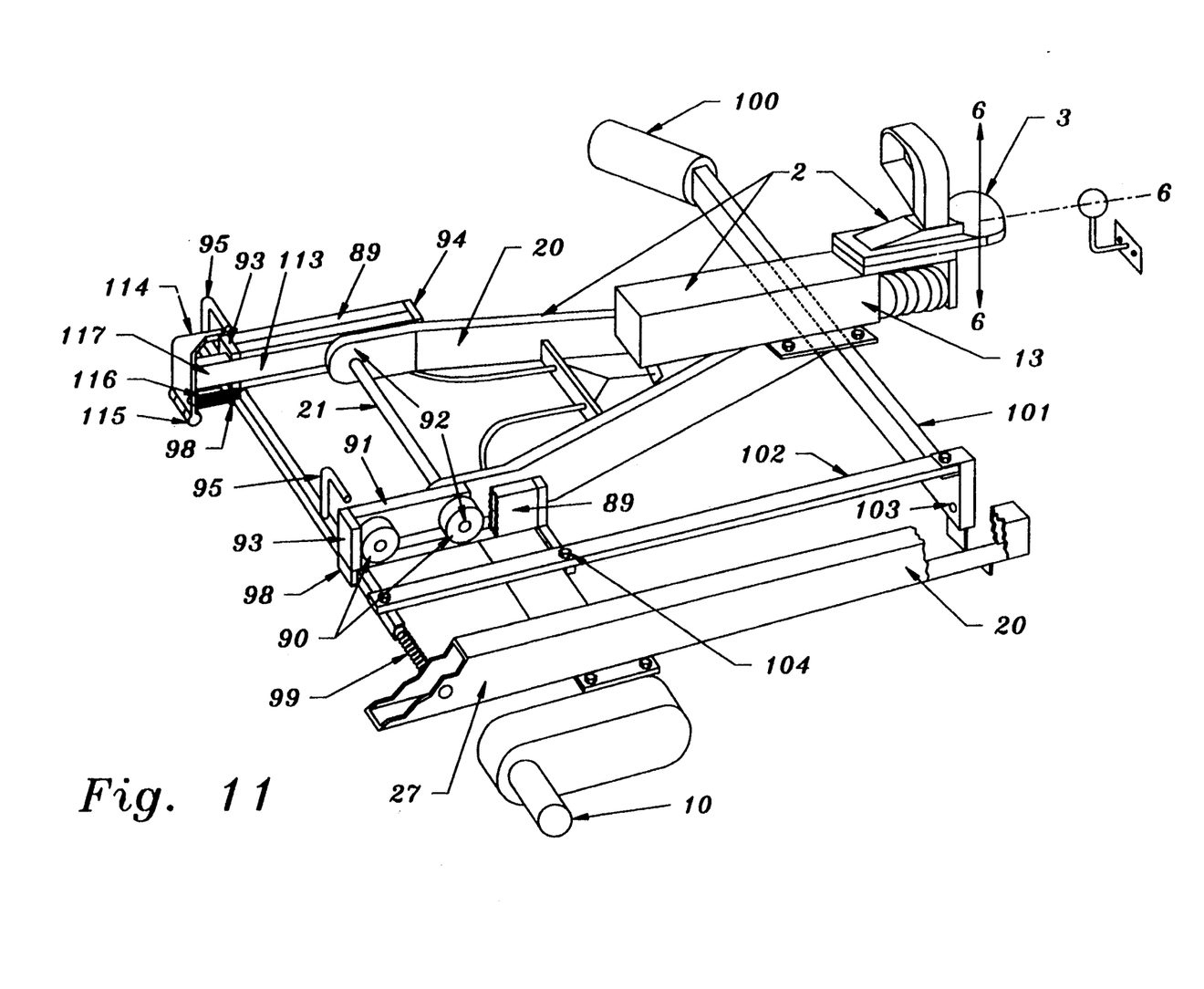
FIG. 11 is a perspective view of the present invention showing the sliding and locking variants of the main towing device.

FIG. 11 shows two variants of the sliding device of the pivoting shaft 21 which allows upward and downward movement of the main towing device 2. This sliding device consists of two C-shaped rails 89 fixed to the chassis 27. The first variant is mounted on the right side of the midplane 6 and consists of sliding rollers 90 fixed in pairs to a bottom plate 91. The second variant is mounted on the left side and consists of a sliding block 113. The pivoting shaft 21 is fixed to the arms 20 as well as to the bottom plate 91 of the right hand variant, or to the sliding block 113 of the left hand variant, by crossing at its extreme ends 92 the arms 20, the bottom plate 91 and the rollers 90 or the sliding block 113.

The main towing device 2, shown with the trailer 1 and motor vehicle 11 in line in the midplane 6, the bottom plates 91 and sliding blocks 113 in back stop position against the rear safety ends 93 solidly fixed to the rails 89, is maintained in the road-ready position by locks 95 which, for example, pass through both the bottom plates 91 and the rails 89, as well as through the rear roller 96 or which slide through the sliding blocks 113. In both examples, the locking of the forward sliding movement of the main towing device 2 is effective, as the towing device 2 can in no case run off the rails 89 to which it is fixed by means of additional front safety ends 94. The locks 95, which are interlinked by a rod 97 sliding in profiles 98 fixed to the rails 89 and to the chassis 20, are pulled hard and maintained in locked position by a tension spring 99 fixed at one end to the locks 95 and at the other end to the chassis 20.

The unlocking of the main towing device 2 is achieved by lifting a handle 100 which acts upon levers 101/102 mounted on hinge pins 103/104 fixed to the chassis 20 which releases the locks 95, thus unlocking the towing device 2 which is then no longer in road-ready position. The lever 101/102 may be changed by replacing the lifting handle 100 with a pedal which at the limit of its travel unlocks the towing device 2 and enables it to slide.

When the towing device 2 has been unlocked by hand and the bottom plate 91 or the sliding block 113 have slightly moved forward, the handle 100 may be released. At the same time, a wedge-type part 114 is then pivoted on a hinge pin 115 by a tension spring 116 to prevent the locks 95 from crossing the rails 89 and to enable the main towing device 2 to slide both to the left and to the right to facilitate hooking the towing head 3 on or off the ball-type hitch 4 of the motor vehicle 11.

The locking of the main towing device 2 is performed automatically when the towing device 2 slides backwards and the bottom plate 91 or the sliding block 113 shifts in back stop position against the rear safety ends 93 and rests at the same time at one end 117 against the wedge-type part 114 by extending the spring 116 that locks the wedge-type part 114, which is shifted and causes the locks 95 to travel in transverse direction into road-ready position of the towing device 2 locked by the action of the spring 99 which maintains the locks 95 in position.

We claim:

1. An apparatus for pulling a trailer with a motor vehicle, said apparatus comprising main towing device for coupling the lower part of the trailer to the rear of the motor vehicle and a flexible fixing device for fastening the front part of the trailer to the roof of the motor vehicle, said main towing device including at least one arm which is hinged at one end to a rotating shaft and fastened at the other end to a body that carries a towing head, a sliding device carried by said rotating shaft, said sliding device being moveable forward and backward allowing the towing head to shift vertically and longitudinally along a vertically and longitudinally oriented midplane of the trailer, and allowing the towing head to shift to the left and to the right of said midplane, whereby an operator can position the towing head onto a ball hitch on the motor vehicle, a locking device for said rotating shaft effectively limiting movement of the shaft when the trailer is coupled onto the vehicle for driving, said flexible fixing device comprising a roof-rack mountable to said motor vehicle and a centering device including a centering head mountable to the front of the trailer, said centering head being removeably attachable to said roof-rack to form an upper connection, said roof-rack including a bearing plate having a hole which receives and holds the centering head, a slide assembly adjacent to said upper connection allowing forward and backward movement of the trailer relative to the motor vehicle, and said slide assembly allowing manual alignment of the centering head with the bearing plate hole while the trailer is coupled to the motor vehicle.

2. A pulling apparatus in accordance with claim 1, wherein:

the centering head has a plurality of zones:

a conical zone at a free end of said centering head, said conical zone having a portion with a diameter smaller than the hole of the bearing plate, a grooved zone for receiving an interlocking key portion of the bearing plate, the groove zone having a width slightly greater than the thickness of the interlocking key portion, a bearing zone with a diameter greater than the hole in the bearing plate, a section of elastic material between the centering head and a support by which the centering head is mountable to the front of the trailer, said section of elastic material including intermediate spacing blocks for allowing height adjustment of said centering head; said zones and said section of elastic material allowing slantwise movement of the trailer with respect to the motor vehicle in longitudinal front and rear and transverse left and right directions, while reducing fatigue failures at the respective mounting location of the trailer and roof-rack, even when in a strongly inclined position.

3. A pulling apparatus in accordance with claim 2 including:

a keying device for coupling the centering head to the roof-rack bearing plate, said keying device comprising two plier jaws, one of the jaws being fixed to the bearing plate, and the other of the plier jaws rotating on a pivot pin which is mounted on the bearing plate, the jaws being moveable into the grooved zone of the centering head, the diameter of the hole into which the conical end of the centering head fits being fixed and being slightly larger than said conical zone, the hole in the plate having a diameter less than the diameter of the bearing zone of the centering head body; the keying device being maintained in locked position by a hook which interlocks the jaws in a road-ready position.

4. A pulling apparatus in accordance with claim 3 wherein:

the roof-rack includes crossbars mounted perpendicular to the longitudinal axis of the roof-rack and fasteners for attaching said roof-rack to the motor vehicle near the doors thereof, said bearing plate being fixed to sliding rails mounted on struts fixed perpendicular to the crossbars, a key for engaging the centering head including a horseshoe-type key which slides at right angles to the longitudinal axis of the roof-rack and closes on the grooved zone of the centering head, said key being lockable in road-ready position by a hook; the sliding rails sliding freely in c-shaped channels; a handle fixed to the plate serving to allow sliding of the plate by hand to position the hole in the plate opposite the conical zone of the centering head either before or after having lodged the main towing device on a ball of a tow-hook mounted at the back of the vehicle; the roof-rack being mountable on the roof of the motor vehicle either by means of lugs welded to the crossbars or, as an alternative, by an attachment which allows adjustment of said crossbars; the crossbar also being equipped with supports for attaching goods to the roof-rack when the vehicle is used without the trailer.

5. A pulling apparatus in accordance with claim 1 wherein:

the main towing device can swing up and down by rotation of said at least one arm said rotating shaft sliding freely, either forward or backward, parallel to a line perpendicular to the vertical midplane, or slantwise with respect to said line and farther backwards on the left, or farther backwards on the right thereof, said main towing device including a guide for allowing the towing head to shift from front to rear and from left to right, said guide comprising two guide bars equipped with elongated slots which receive ends of the shaft, said guide bars being fixed to side rails of the pulling apparatus by means of an axle shaft.

6. A pulling apparatus in accordance with claim 1 wherein:

said sliding device comprises two longitudinal c-shaped rails and sliding blocks slideable in said rails carried by ends of the rotating shaft.

7. A pulling apparatus in accordance with claims 6 wherein:

a locking device for locking the pivoting shaft of the main towing device in road-ready position whereby movement of said towing head is restricted to movement in said midplane, said locking device comprising pins urged to a locked position by a spring, a handle for unlocking said pins comprising levers and rods moveable to release the pins from said locked position.

8. A pulling apparatus in accordance with claim 7 including:

a wedge-type part moveable by the action of a spring to cause said pins to assume an unlocked position and enabling the main towing device to slide right and left and allowing an operator to hook the towing head on or off a tow-ball of the motor vehicle, the main towing device automatically locking through backward sliding movement of said wedge-type part, one end of a sliding block positionable against a rear safety end on at least one of said c-shaped rails and at the same time pushing against the wedge-type part and extending the spring which acts upon the wedge-type part, shifting said wedge-type part and causing the automatic transverse movement of the pins which lock the towing device in road-ready position.

9. A pulling apparatus in accordance with claim 1 wherein:

the sliding device of the centering head is not part of the roof-rack of the motor vehicle, said sliding device being fixed on a support mountable on sliding blocks that are free to slide in sliding rails fixable to the structure of the front part of the trailer; a handle for enabling easy shifting of the centering head in the sliding rails to put the centering head opposite the hole of the plate and said handle enabling shifting of the front part of the trailer in transverse direction to put the centering head in line with the axis of the hole; the bearing device that supports the front part of the trailer on the motor vehicle being a special roof-rack whose bearing plate includes a hole for receiving the centering head, said bearing plate being rigidly fixed to the crossbars of the roof-rack; a rack handle for allowing an operator to pull a slide that locks a key on the centering head by extending a spring on the bearing plate, thus unlocking the centering head and enabling the trailer to be removed from the motor vehicle.

10. A pulling apparatus in accordance with claim 1 including a tent canopy assembly, a rear panel which can be lifted and maintained in lifted position by at least one pole; a tent canopy attachable to said panel by fasteners.

* * * * *